United States Patent [19]
Yanagisawa

[11] Patent Number: 6,040,031
[45] Date of Patent: *Mar. 21, 2000

[54] CONTACT RECORDING MAGNETIC DISK DEVICE

[75] Inventor: Masahiro Yanagisawa, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,630

[22] Filed: Mar. 13, 1997

[30] Foreign Application Priority Data

Mar. 13, 1996 [JP] Japan ................................. 8-055869
Nov. 17, 1996 [JP] Japan ................................. 8-315986

[51] Int. Cl.$^7$ ....................................................... G11B 5/71
[52] U.S. Cl. ................................. 428/65.4; 428/694 TP; 428/900; 360/135
[58] Field of Search ........................... 428/65.4, 694 TP, 428/65.8, 900; 360/102, 135; 508/280

[56] References Cited

U.S. PATENT DOCUMENTS

| | | | |
|---|---|---|---|
| 4,156,052 | 5/1979 | Tanaka et al. ........................ | 428/500 |
| 4,877,557 | 10/1989 | Kaneshige et al. ................... | 252/56 S |
| 5,097,368 | 3/1992 | Lemke et al. ........................ | 360/97.02 |
| 5,200,867 | 4/1993 | Albrecht et al. ..................... | 360/103 |
| 5,612,838 | 3/1997 | Smith et al. ......................... | 360/102 |
| 5,616,668 | 4/1997 | Harrison et al. ..................... | 526/271 |

FOREIGN PATENT DOCUMENTS

| | | |
|---|---|---|
| 5-151735 | 6/1993 | Japan . |
| 5-217157 | 8/1993 | Japan . |
| 62-167611 | 11/1998 | Japan . |
| WO 93/14495 | 12/1998 | WIPO . |

OTHER PUBLICATIONS

"Contact Recording On Perpendicular Rigid Media" by Harold Hamilton Journal of Magnetic Society of Japan vol. 15 Supplement, No. S2(1991),pp. 483–490.

*Primary Examiner*—Stevan A. Resan

[57] ABSTRACT

In order to provide a contact type magnetic disk device enabling a high density recording with improved reliability and sufficient robustness against wearing, a magnetic recording disk of the present invention comprises a body coated with a lubricant thin film of one of polybutene, maleic-anhydride-denatured polybutene and maleic-anhydride-denatured poly-alpha-olefin.

16 Claims, 8 Drawing Sheets

CONTACT RECORDING MAGNETIC DISK DEVICE

BACKGROUND OF THE INVENTION

The present invention relates to a contact recording magnetic disk device mainly to be applied for an external memory of a computer.

Recording density becomes still higher year by year in the field of information recording media. As for the magnetic disk device among them, reduction of the spacing, that is, separation between recording media and read/write head, is one of the most important factors for realizing a high recording density. For the purpose, there have been proposed some contact recording magnetic disk devices having read/write head in sliding contact with magnetic recording disk instead of the flying type read/write head, such as described in "Contact Recording on Perpendicular Rigid Media" by H. Hamilton, Journal of the Magnetic Society of Japan, Vol. 15 Supplement, No. S2(1991), pp. 483–490 or disclosed in a PCT patent application laid open as an International Publication No. WO 93/14495.

In the contact recording magnetic disk devices of the above prior arts, there are left unsolved such problems caused by the high speed sliding contact between magnetic head slider and recording media, that both the magnetic head slider and the recording media are easily worn out or that the recording density can not be so improved as expected because of spacing fluctuation caused by jumping of the magnetic head slider on the recording media.

As another prior art, lubrication of carbonic film protecting surface of the recording media is disclosed in a Japanese patent application laid open as a Provisional Publication No. 151735/'93, wherein two types of lubricants are recommended, perfluoropolyether having one polarization group, provided by the DAIKIN Industry under the name of "Demnum SP", and hydrocarbonic lubricant consisting of poly-1-decene. However, either fluid lubricant can not provide sufficient coating ability for preventing the magnetic head slider from wearing.

SUMMARY OF THE INVENTION

Therefore, a primary object of the present invention is to provide a contact recording magnetic disk device enabling a high density recording with improved reliability and sufficient robustness against wearing, by resolving above problems.

In order to achieve the object, a magnetic recording disk of the present invention comprises a body coated with a lubricant thin film of one of polybutene, maleic-anhydride-denatured polybutene and maleic-anhydride-denatured poly-alpha-olefin of a viscosity from 100 cSt to 100,000 cSt, with a lubricant thin film of mixture of polybutene of a viscosity under 100 cSt and a viscosity over 100,000 cSt, or with a lubricant thin film of mixture of one of maleic-anhydride-denatured polybutene and maleic-anhydride-denatured poly-alpha-olefin of a viscosity near 100 cSt and a viscosity near 100,000 cSt.

The magnetic recording disk may preferably further comprise a combination layer between the lubricant thin film and the body.

Being a chain polymer, each of the polybutene, the maleic-anhydride-denatured polybutene and the maleic-anhydride-denatured poly-alpha-olefin maintains liquidity through extensive range of its molecular weight, and so viscosity of a far wider range can be prepared with them, providing an excellent liquid lubricant as to its wearing protection performance.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

DETAILED DESCRIPTION OF THE PREFERRED EMBODIMENTS

Now, embodiments of the present invention will be described in connection with the drawings.

Figure 1:
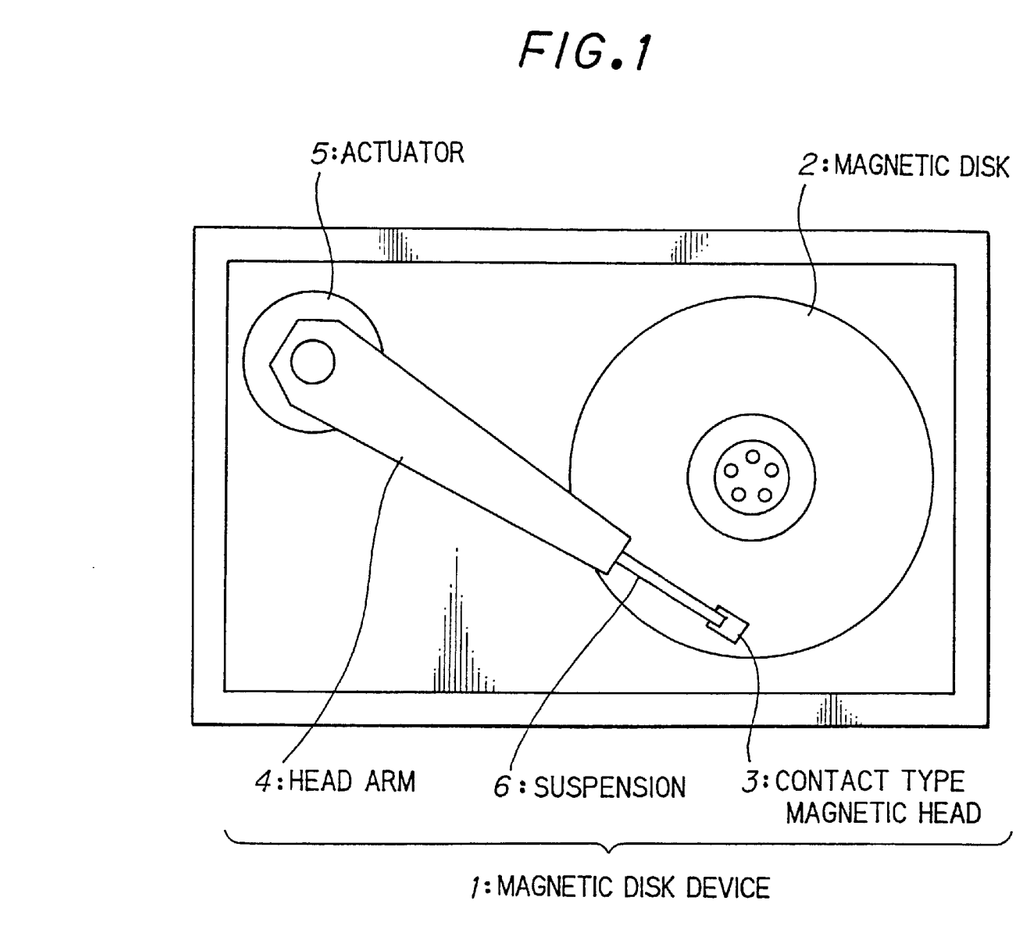
FIG. 1 is a plan view illustrating an example of a magnet disk device according to the present invention.
Figure 2:
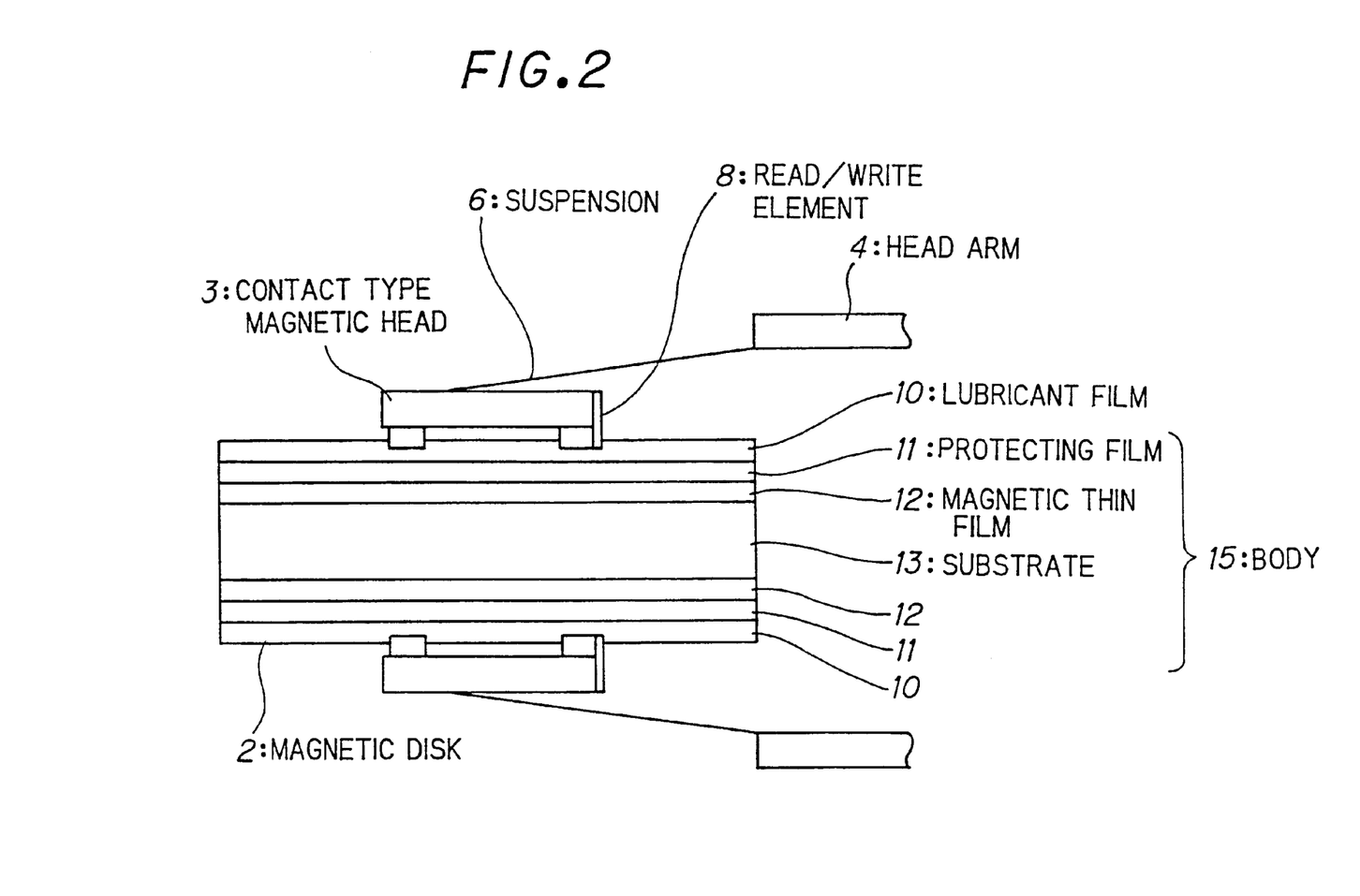
FIG. 2 is a partial sectional view illustrating a magnetic disk 2 of FIG. 1 according to an embodiment of the invention.

FIG. 1 is a plan view illustrating a magnet disk device 1 according to an embodiment of the invention, of which a partial sectional view is shown in FIG. 2. Referring to FIGS. 1 and 2, the magnetic disk device 1 comprises a contact recording magnetic head 3 provided with a read/write element 8, a head arm 4 having a suspension 6 for supporting the contact recording magnetic head 3 with a load of at most 500 mg, and a magnetic disk 2.

The magnetic disk 2 consists of a body 15 coated with a lubricant film 10, the body 15 including a substrate 13, a magnetic thin film 12 provided on the substrate 13, and a protecting film 11 coating the magnetic thin film 12 for its protection.

As to the lubricant film 10, there is applied one of the following three materials, polybutene, maleic-anhydride-denatured polybutene maleic-anhydride-modified poly-alplha-olefin.

The polybutene, the maleic-anhydride-modified polybutene and the maleic-anhydride-modified poly-alpha-olefin name generically organic compounds having basic structures represented by following chemical formulas (1) to (3), respectively.

(1)

(2)

(3)

where l is an integer from 3 to 100, while m and n are integers from 1 to 10.

Viscosity of polybutene, depending on size of l, varies from 19.5 cSt to 1,200,000 cSt when l is from 3 to 70. Similarly, those of maleic-anhydride-modified polybutene and maleic-anhydride-modified poly-alpha-olefin vary from 100 cSt to 1,000,000 cSt when m and n are from 1 to 10.

Being a chain polymer, each of the polybutene, the maleic-anhydride-denatured polybutene and the maleic-anhydride-modified poly-alpha-olefin maintains liquidity through extensive range of its molecular weight, and so viscosity of a far wider range can be prepared with them compared with other polymers such as the poly-1-decene or the perfluoropolyether applied in the disclosure of the Provisional Publication No. 151735/'93, providing an excellent liquid lubricant as to its wearing protection performance.

Furthermore, a strong affinity with carbonic protecting films 11 of maleic acid of the terminal functional group of the maleic-anhydride-modified polybutene and the maleic-anhydride-denatured poly-alpha-olefin gives them an excellent robustness against wearing.

Figure 3:
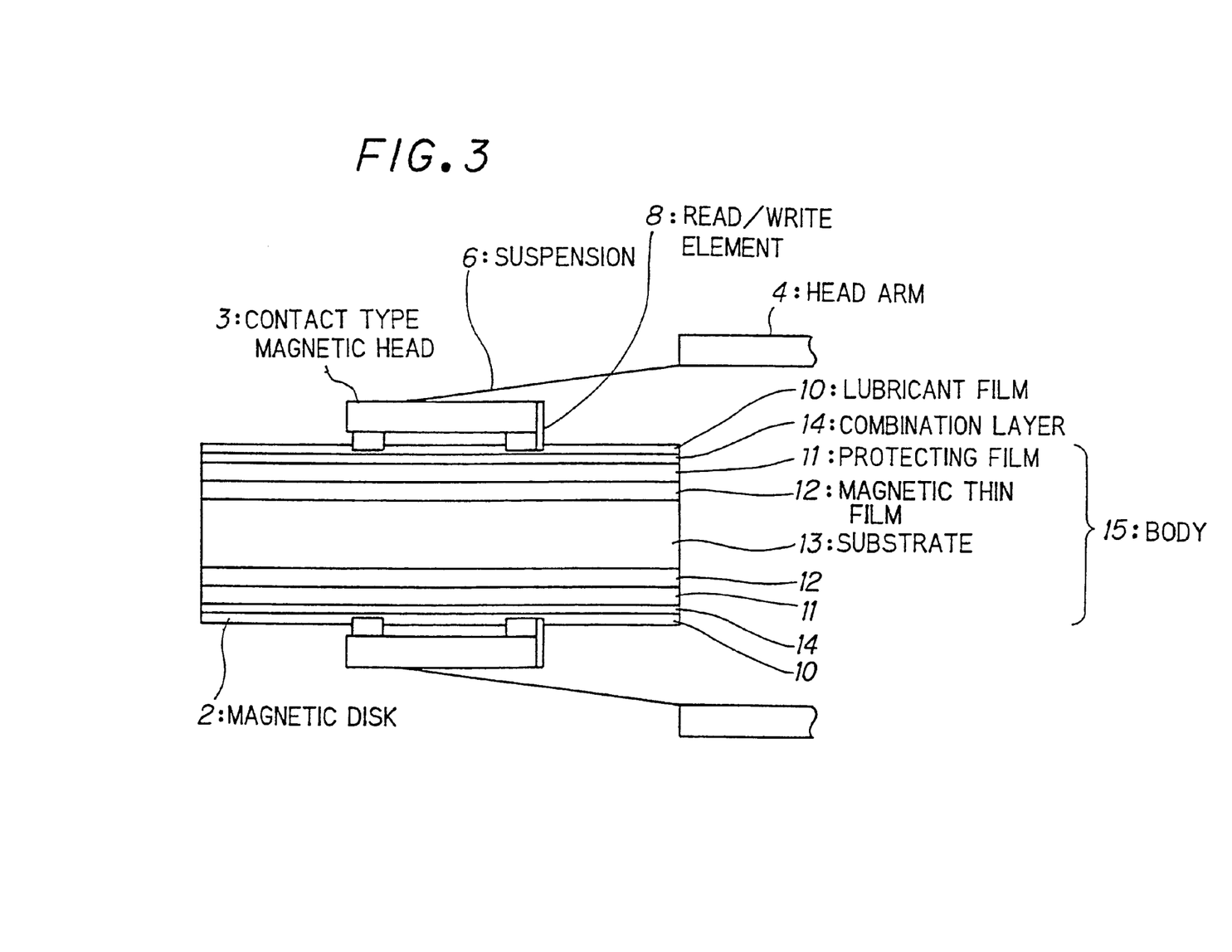
FIG. 3 is a partial sectional view illustrating the magnetic disk 2 according to another embodiment of the invention.

FIG. 3 is a sectional view illustrating a magnetic disk 2 according to another embodiment of the invention, wherein a combination layer 14 is further provided between the lubricant film 10 and the body 15.

As for liquid molecules to be applied for the combination layer 14, organic compounds having good affinity with the body 15 are selected, of which a first series is represented by following chemical formula (4).

(4)

Here, each of $G_1$ and $G_2$ represents a functional group selected among —OH, —COOH, —COOR, —OOCC($CH_3$)=$CH_2$, —$NH_2$, —N($CH_3$)$_2$, —CH=$CH_2$, —NCO, —$SO_3$H, and —N=N—$NH_2$, where R denotes —$C_hX_{2h+1}$, —$C_6X_5$ (benzene ring) or —$C_iX_{2i+1}C_6X_5$ (h and i being natural numbers not greater than 4, and X representing one of H, F, Cl, Br and I). Among them, functional groups having oxygen, especially those such as —OH or —COOH or functional groups such as amino group or sulfonic group are preferable because of their stronger interactivity than those having π electrons such as divalent combination or benzene ring. There may be also applied functional groups disclosed in a Japanese patent application laid open as a Provisional Publication No. 217157/'93, such as —$SO_2$NHCO, —CSOH or —COSH.

$R_1$ represents carbonic chains expressed as —$C_jX_{2j}$—, —$C_jX_{2j}O$—, j being a natural number not greater than 6, and X representing one of H, F, Cl, Br and I.

The upper limits of h, i and j are above described for indicating range of them where corresponding organic compounds remain liquid at normal temperature.

Followings are concrete examples of the first series;

ethyleneglycol: $HOCH_2CH_2OH$, propylenglycol: $H_3CCH(OH)CH_2OH$, trimethyleneglycol: $HO(CH_2)_3OH$, 1,4-butanediol: $HO(CH_2)_4OH$, 1,3-butyleneglycol: $H_3CCH(OH)CH_2CH_2OH$, 1,5-pentanediol: $HO(CH_2)_5OH$, octanediol: $H_3CC_2H_4CH(OH)CH(C_2H_5)CH_2OH$, glycerin: $CH_2(OH)CH_2(OH)CH_2(OH)$, diglycerin: $H_2C(OH)CH(OH)CH_2OCH_2CH(OH)CH_2(OH)$, dipropylenglycol: $(H_3CCH(OH)CH_2)_2O$, polyethyleneglycol: $HO(CH_2CH_2O)_nCH_2CH_2OH$, n being an integer giving molecular weight of 190 to 630, diethylen glycol, triethylen glycol, heptylethylene glycol, di-iodinemethan, dibromomethane, dibromo-octane, dibromobutane, dibromohexane, dimethylsulfoxide, dichlorohexane, dichloro-octane, dioxane, methacrylate copolymer, oxalate, malonate, succinate, such as
    succinic dimethyl ester,
    succinic monoethyl ester,
    succinic methyl ester,
    succinic di-2-oxyethyl ester,
    succinic diallyl ester, or
    succinic ethylester nitrile, glutaric ester, adipate, pimelic ester, suberate, azelate, sebacate, maleate, e.g. maleic dimethyl ester: $H_3COOCCH=CHCOOCH_3$, fumarate, phthalate, isophthalate, terephthalate, glycolate, and polyether and polyol, represented by following chemical formulas, $R_n$ denoting n: integer corresponding to molecular weight from 200 to 4000;

n: integer corresponding to molecular weight from 250 to 4000;

n: integer corresponding to molecular weight of 400;

m, n: integers corresponding to average molecular weight of 3000;

n: integer corresponding to average molecular weight of 2600;

m, n: integers corresponding to average molecular weight of 4500;

n: integer corresponding to average molecular weight of 700;

A second series of the liquid molecules to be applied for the combination layer 14 is silicone oil represented by following chemical formula (5).

Examples thereof are:

silanol-terminated polydimethyl siloxane ($G_5$: —OH, $G_6$: —H, $R_9$, $R_{10}$: —$CH_3$, n=7 to 4000);

alcohol-terminated polydimethyl siloxane, such as
that carbinol-terminated ($G_5$: $HOCH_2CH_2O$—, $G_6$: —$CH_2CH_2OH$, $R_9$, $R_{10}$: —$CH_3$, n: an integer corresponding to molecule weight of 2400), or
that hydroxylpropyl-terminated ($G_5$: $HOCH_2CH_2CH_2O$—, $G_6$: —$CH_2CH_2CH_2OH$, $R_9$, $R_{10}$: —$CH_3$, n: an integer corresponding to molecule weight of 2400);

polydimethyl-hydroxyethylenoxidemethyl siloxane ($G_5$: —$OSi(CH_3)_3$, $G_6$: —$(Si(CH_3)(OCH_2CH_2OH)O)_m Si(CH_3)_3$, $R_9$, $R_{10}$: —$CH_3$, m=3, n: an integer corresponding to molecule weight of 50 to 4000);

acetoxy-terminated polydimethyl siloxane ($G_5$: —$OOCCH_3$, $G_6$: —$Si(CH_3)_2 OOCCH_3$, $R_9$, $R_{10}$: —$CH_3$, n: an integer corresponding to molecule weight of 36000);

dimethylamino-terminated polydimethyl siloxane ($G_5$: —$N(CH_3)_3$, $G_6$: —$Si(CH_3)_2N(CH_3)_3$, $R_9$, $R_{10}$: —$CH_3$, n: an integer corresponding to molecule weight of 425 to 600);

ethoxy-terminated polydimethyl siloxane ($G_5$: —$OC_2H_5$, $G_6$: —$C_2H_5$, $R_9$, $R_{10}$: —$CH_3$, n: an integer corresponding to molecule weight of 360 to 450);

stearoxy-terminated polydimethyl siloxane ($G_5$: $C_{17}H_{35}COO$—, $G_6$: —$OC_{17}H_{35}$, $R_9$, $R_{10}$: —$CH_3$, n: an integer corresponding to molecule weight of 360 to 450);

amino-group-terminated polydimethyl siloxane ($G_5$: $H_2NC_3H_6$—, $G_6$: —$Si(CH_3)_2C_3H_6NH_2$, $R_9$, $R_{10}$: —$CH_3$, n=1);

carboxylpropyl-terminated polydimethyl siloxane ($G_5$: $HOOCC_3H_6$—$G_6$: —$Si(CH_3)_3C_3H_6COOH$, $R_9$, $R_{10}$: —$CH_3$, n=1);

carboxylpropyl-terminated T-structural polydimethyl siloxane ($G_5$: $HOOCC_3H_6$—, $G_6$: —$[Si(CH_3)_2O]_o Si(CH_3)_3$, $R_9$, $R_{10}$: —$CH_3$, —$O[Si(CH_3)_2O]_p Si(CH_3)_3$, n, o and p: integers corresponding to molecule weight of 100 to 10000);

glycidoxypropyl-terminated polydimethyl siloxane polyglicidoxypropylmethyl siloxane ($G_5$, $G_6$: —($CH_3$)$_3$, $R_9$: —$C_3H_6OCH_2CH$—$CH_2$, $R_{10}$: —$CH_3$, n: integer corresponding to molecular weight from 360 to 450);

polyglicidoxypropylmethyl polydimethyl siloxane copolymer ($G_5$: ($CH_3$)$_3$SiO—, $G_6$: —(Si($CH_3$)$_2$O)$_t$Si($CH_3$)$_3$, $R_9$: —($C_3H_6$)OCH$_2$CH—CH$_2$, $R_{10}$: —CH$_3$, n, t: integers corresponding to molecular weight of 100 to 1000);

methacryloxypropyl-terminated polydimethyl siloxane ($G_5$: —$CH_2$=C($CH_3$)COO$C_3H_6$, $G_6$: —Si($CH_3$)$_2C_3H_6$OOCC($CH_3$)=$CH_2$, $R_9$, $R_{10}$: —$CH_3$, n: integer corresponding to molecule weight of 387);

polydimethylmethacryloxypropylmethyl siloxane ($G_5$: ($CH_3$)$_3$SiO—, $G_6$: —[Si($CH_3$)$_2$O]$_a$Si($CH_3$)$_3$, $R_9$: —$C_3H_6$OOCC($CH_3$)=$CH_2$, $R_{10}$: —$CH_3$, n and a: integers corresponding to molecule weight of 100 to 1000); and polymercaptopropylmethyl siloxane ($G_5$: ($CH_3$)$_3$SiO—, $G_6$: —Si($CH_3$)$_3$, $R_9$: —$C_3H_6$SH, $R_{10}$: —$CH_3$, n: integer crresponding to molecular weight of 100 to 1000).

There can be also applied silicon oil not according to the chemical formula (5), such as bis(aminopropyldimethylsilyl)benzene: $H_2NC_3H_6Si(CH_3)_2C_6H_4Si(CH_3)_nC_3H_6NH_2$.

A third series of liquid molecules to be applied for the combination layer 14 is represented by following chemical formula (6).

$$G_7CF_2[OC_2F_4]_r[OCF_2]_sOCF_2G_7 \qquad (6)$$

where $G_7$ represents one of —COOCH$_3$, —COOH, —CH$_2$OH, CONHC$_6H_3(CH_3)$NCO— (denoted by Is), and piperonyl group (denoted by Pi) expressed by and r and s are integers corresponding to molecule weight of 1000 to 10000 having relation $0.5 \leq r/s \leq 2.0$.

Examples of them are:

HOCH$_2$CF$_2$[OC$_2$F$_4$]$_r$[OCF$_2$]$_s$OCF$_2$CH$_2$OH (r/s=0.8, molecule weight: 2300);

HOOCCF$_2$[OC$_2$F$_4$]$_r$[OCF$_2$]$_s$OCF$_2$COOH ( r/s=0.8, molecule weight: 2000);

H$_3$COOCF$_2$[OC$_2$F$_4$]$_r$[OCF$_2$]$_s$OCF$_2$COOCH$_3$ (r/s=0.8, molecule weight: 2200);

PiCF$_2$[OC$_2$F$_4$]$_r$[OCF$_2$]$_s$OCF$_2$Pi ( r/s=0.8, molecule weight: 2000); and IsCF$_2$[OC$_2$F$_4$]$_r$[OCF$_2$]$_s$OCF$_2$Pi (r/s=0.8, molecule weight: 2500).

A fourth series of liquid molecules to be applied for the combination layer 14 is perfluoropolyether represented by following chemical formulas;

F[CF(CF$_3$)CF$_2$O]$_d$C$_2$F$_4$COOH (molecule weight: 7000);

F[CF(CF$_3$)CF$_2$O]$_d$C$_2$F$_4$CH$_2$OH (molecule weight: 4500);

F(C$_3$F$_6$O)$_e$C$_2$F$_4$COOCH$_3$ (molecule weight: 4000);

F(C$_3$F$_6$O)$_e$C$_2$F$_4$COOCH$_2$C$_6$H$_5$ (molecule weight: 4100);

F(C$_3$F$_6$O)$_e$C$_2$F$_4$COOH (molecule weight: 3300); and

F(C$_3$F$_6$O)$_e$C$_2$F$_4$CH$_2$OH (molecule weight: 3400).

Without sufficient degrees of freedom, liquid molecules of these four series are inferior as the lubricant film and can not themselves improve robustness against wearing. However, they can combine the lubricant film 10 with the protecting film 11, preventing the lubricant film 10 to be rubbed out by the contact type magnetic head 3.

Therefore, the liquid molecule of these three series can provide an excellent robustness against wearing, combined into two layers with the lubricant film 10 such as the polybutene or others above described having no functional group.

Returning to FIG. 1, various spring materials such as stainless steel, phosphor bronze, silicon or alumina may be applied for the suspension 6. As for slider or contacting pad of the contact type magnetic head 3, there can be also applied various hard materials such as ferrite, alumina, sintered alloy of alumina and titanium carbide, that of beryllium oxide and titanium carbide, that of alumina and SiC, titanic calcium, titanic barium, glassy carbon, amorphous carbon, SiO$_2$, ZrO$_2$, TiO$_2$, boron nitride, sapphire, Si, or diamond.

Similarly as for protecting film 11, thin film of various materials can be applied, such as amorphous carbon, hydrogenated amorphous carbon, diamond, diamond type carbon, BN, CN$_\kappa$ ($\kappa$ being 0 to 0.5), SiO$_2$, ZrO$_2$, or TiO$_2$.

In the following paragraphs, some results of wearing test concerning the embodiments will be described.

The wearing tests are performed with the magnetic disk device 1 described in connection with FIGS. 1 to 3, wherein a magnetic head made from sintered alloy of alumina and titanium carbide is applied for the contact recording magnetic head 3 after coated with thin film of diamond type carbon by plasma chemical vapor deposit method. The contact type magnetic head 3 provided with the read/write element 8 at its one side is set by way of the suspension 6 made of stainless steel of 10 mm×0.5 mm×0.03 mm to the head arm 4 driven by an actuator 5.

As for bodies 15 of magnetic disks 2 to be tested, they are prepared with substrates 13 coated with under coatings (not shown in FIG. 2 or 3), which are coated by spattering with magnetic thin films 12 of 30 nm of CoPtCr, protecting films 11 of 2 nm of 10% hydrogenated carbon spattered thereon.

With the bodies 15 thus prepared, following twelve groups of test objects and two examples to be compared are prepared, a first to a fourth groups with the polybutene lubricant film, a fifth to eighth groups with the maleic-anhydride-modified polybutene lubricant film and a ninth to eleventh groups with the maleic-anhydride-modified poly-alpha-olefin lubricant film;

the first group consisting of a plurality of test objects prepared by coating thereon polybutene lubricant films 10 of 5 nm each having different viscosity from 10 cSt to 10,000,000 cSt by way of dipping method in hexane solution, the second group consisting of one test object prepared by coating thereon a lubricant film 10 of 5 nm depositted of a mixture (1:1 in mol. rate) of polybutene of 19 cSt viscosity and that of 1,200,000 cSt, the third group consisting of one test object prepared by coating thereon a lubricant film 10 of 5 nm depositted of a mixture (1:1 in mol. rate) of polybutene of 125 cSt viscosity and that of 120,000 cSt, the fourth group consisting of a plurality of test objects prepared by coating thereon combination layers 14 of 2 nm of polyethylene glycol having molecule weight of 630, for the first, and polybutene lubricant films 10 of 3 nm each corresponding to each of those applied for the first, the second and the third groups, the fifth group consisting of a plurality of test objects prepared by coating thereon maleic-anhydride-modified polybutene lubricant films 10 of 5 nm each having different viscosity from 100 cSt to 1,000,000 cSt by way of dipping method in hexane solution, the sixth group consisting of one test object prepared by coating thereon a lubricant film 10 of 5 nm deposited of a mixture (1:1 in mol. rate) of maleic-anhydride-modified polybutene of 100 cSt viscosity and that of 1,000,000 cSt, the seventh group consisting of one test object prepared by coating thereon a lubricant film 10 of 5 nm deposited of a mixture (1:1 in mol. rate) of maleic-anhydride-modified polybutene of 125 cSt viscosity and that of 120,000 cSt, the eighth group consisting of a plurality of test objects prepared by coating thereon combination layers 14 of 2 nm of polyethylene glycol having molecule weight of 630, for the first, and maleic-anhydride-modified polybutene lubricant films 10 of 3 nm each corresponding to each of those applied for the fifth, the sixth and the seventh groups, the ninth to twelfth groups being also prepared in the same way with the fifth to eighth groups replacing the maleic-anhydride-modified polybutene with the maleic-anhydride-modified poly-alpha-olefin, a first comparison example prepared by coating thereon the perfluoropolyether lubricant film, disclosed in the beforehand mentioned Provisional Publication No. 151735/'93, of 5 nm by way of dipping method in perfluoro-octane solution, and a second comparison example prepared by coating thereon a combination layer of 2 nm of hydroxyl-group-modified perfluoropolyether deposited in perfluoro-octane solution, for the first, and the perfluoropolyether of 3 nm by way of dipping method in perfluoro-octane solution.

Figure 4:
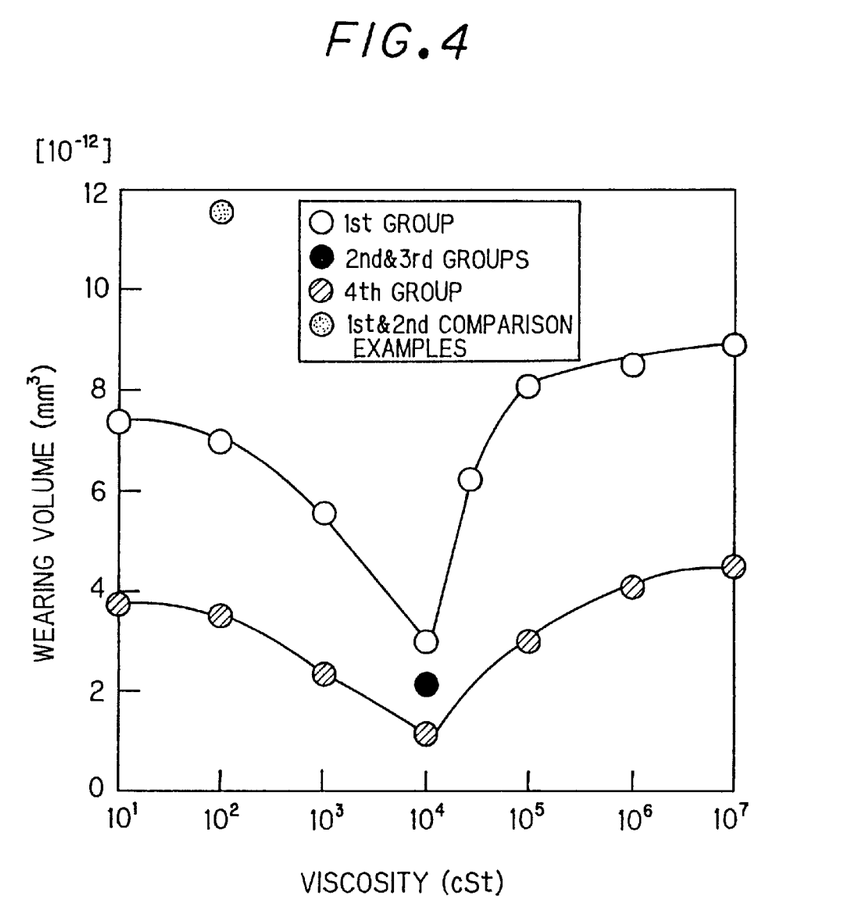
FIG. 4 is a graphic chart illustrating results of the wearing tests represented by wearing volume of the contact recording magnetic head 3 measured by an atomic force microscope.

FIG. 4 is a graphic chart illustrating results of the wearing tests represented by wearing volume of the contact recording magnetic head 3 measured by an atomic force microscope, after each 1000 hours' operation at 5400 rpm of the above test objects of the first to fourth groups and the comparison examples.

FIG. 4 shows that the wearing volume depends deeply on the viscosity of the polybutene lubricant films 10, becoming minimum at viscosity of 9000 cSt and larger both in high and low viscosity ranges.

It is because lubricant film of high viscosity has little auto-restoration performance by diffusion even though robust against break off by the contact slide of the magnetic head, the situation being vice versa with that of low viscosity.

From FIG. 4, it can be said;

that a viscosity of 100 to 100,000 cSt is preferable for the polybutene lubricant film 10 as shown by the results of test objects of the first and the forth groups, that polybutene mixture of a high and a low viscosity such as test objects of the second and the third groups also can provide a good result, even with polybutene having viscosity out of the above range, that the combination layer 14 can effectively improve robustness against wearing as shown by results of the fourth group, and that comparison examples of the prior arts are inferior to every test object according to the embodiments even in the case of the second comparison example provided with the combination layer.

Figure 5:
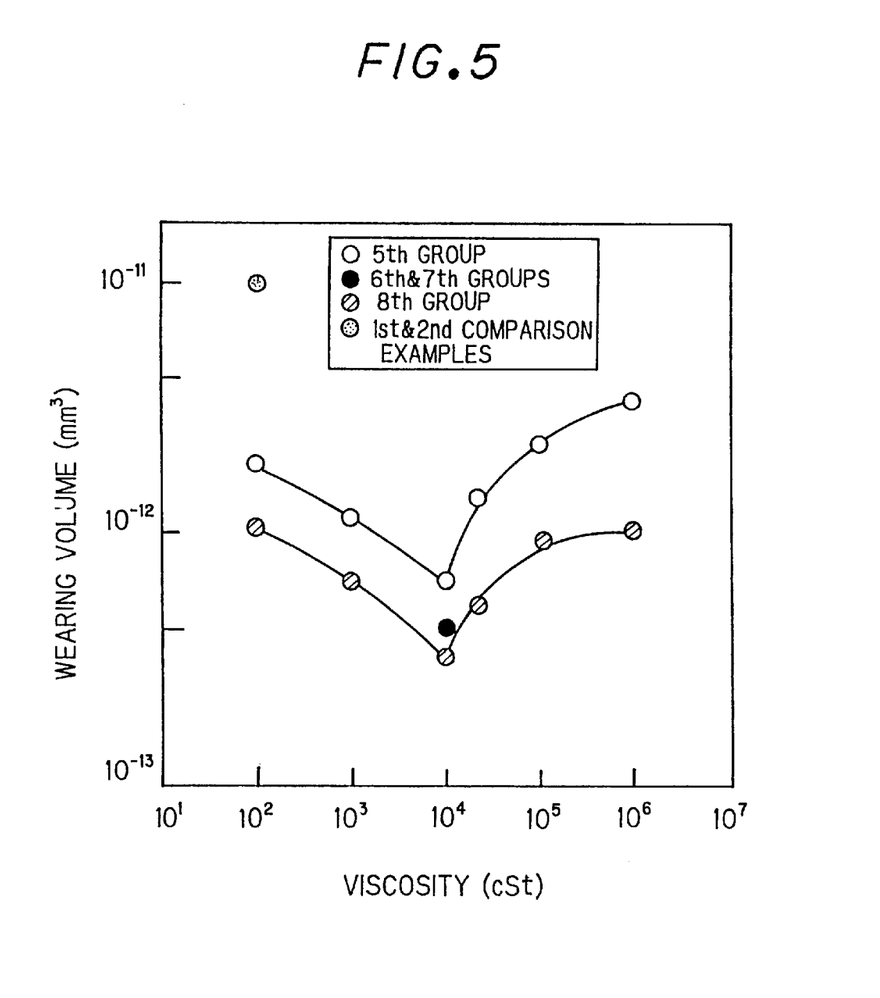
FIG. 5 is a graphic chart illustrating another set of results of the wearing tests.
Figure 6:
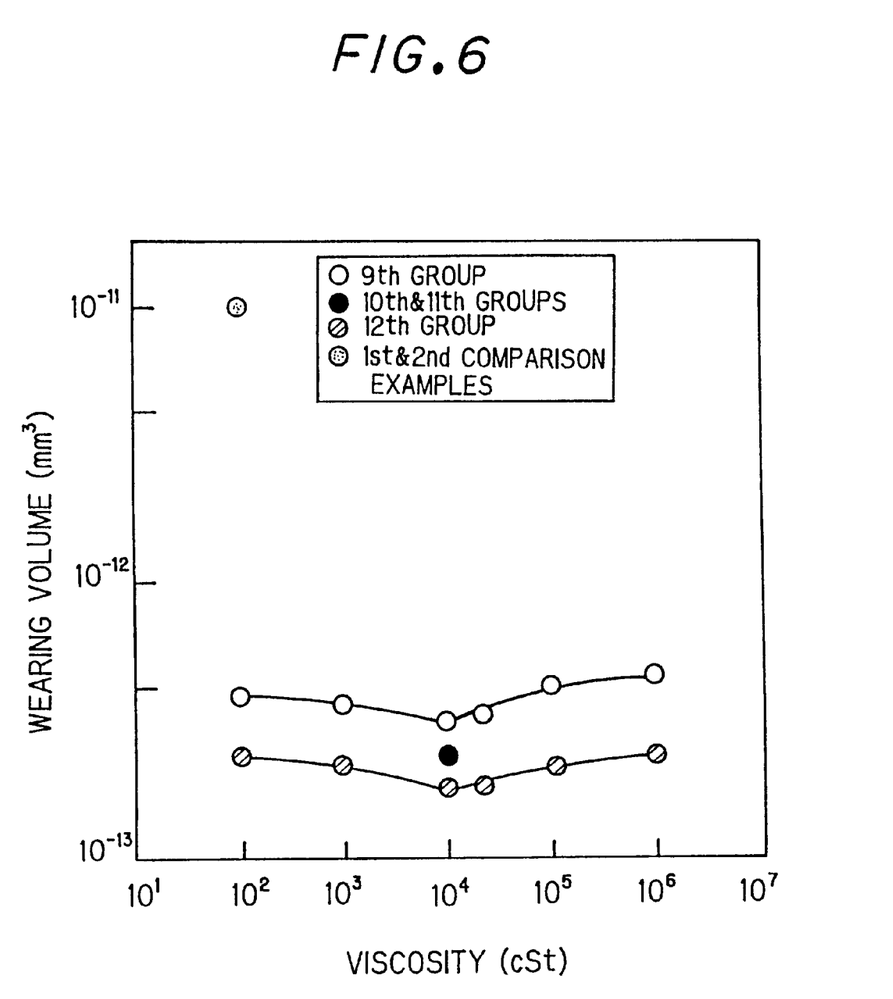
FIG. 6 is a graphic chart illustrating still another set of results of the wearing tests.

FIGS. 5 and 6 are graphic charts illustrating results of the wearing tests performed for the fifth to eighth groups and the ninth to twelfth groups, respectively, in the same way with the first to fourth groups of FIG. 4.

From FIGS. 5 and 6, it can be seen;

that the wearing volume depends on the viscosity of the maleic-anhydride-modified polybutene or the maleic-anhydride-modified poly-alpha-olefin applied for the lubricant films 10, both becoming minimum at viscosity of 9000 cSt and larger either in high or low viscosity ranges, which is considered because of the same reason with the polybutene lubricant film of FIG. 4, that mixture of maleic-anhydride-modified polybutene or the maleic-anhydride-modified poly-alpha-olefin of a high and a low viscosity such as test objects of the sixth and seventh or the tenth and eleventh groups also can provide a good result, that the combination layer 14 can effectively improve robustness against wearing as shown by results of the eighth and the twelfth groups, and that the maleic-anhydride-modified polybutene of 10000 cSt viscosity results in a smaller wearing volume of $7 \times 10^{-13}$ mm$^3$ than that of $3 \times 10^{-12}$ mm$^3$ of the polybutene of the same viscosity, the maleic-anhydride-modified poly-alpha-olefin showing a still little better performance than the maleic-anhydride-modified polybutene, which seems owing to affinity increased by polarity of the maleic acid.

In the wearing test of FIGS. 4 to 6, polyethylene glycol having molecule weight of 630 is applied for the combination layer 14, but other materials beforehand described are similarly confirmed to show the same performance.

Figure 7:
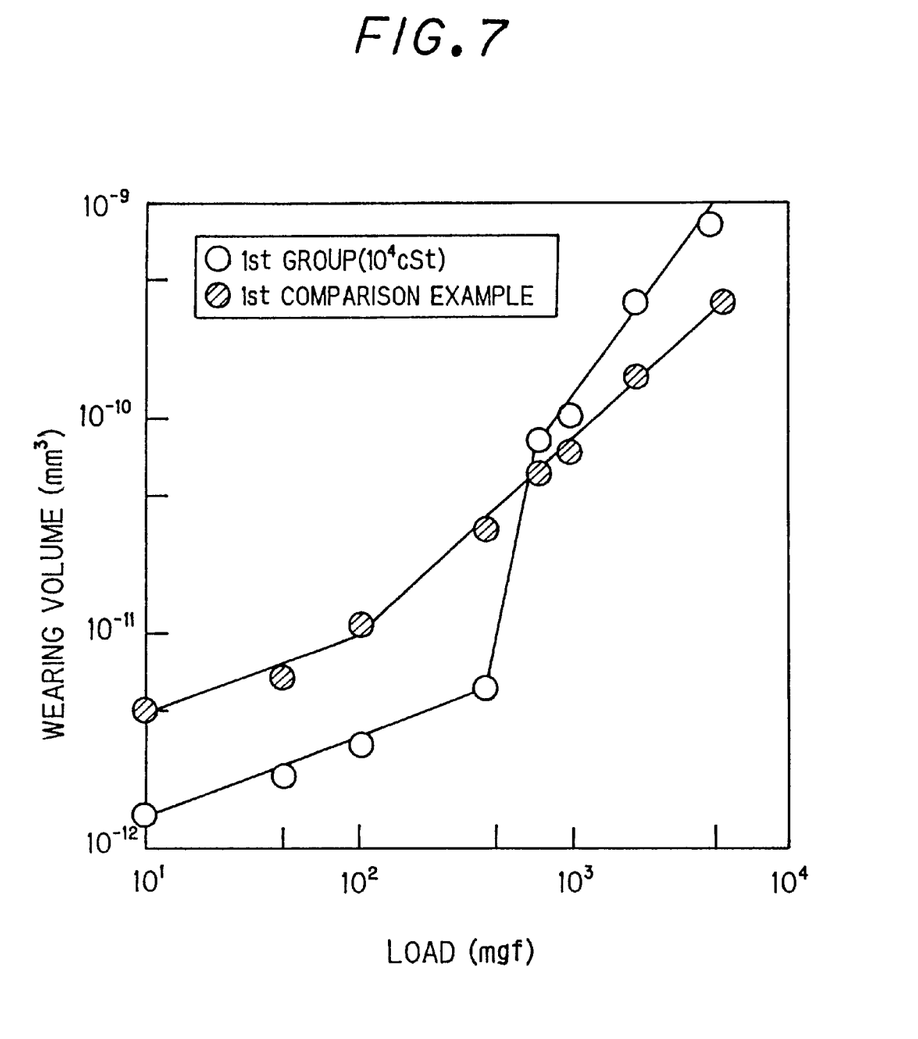
FIG. 7 is a graphic chart illustrating still another set of results of the wearing tests.

FIG. 7 is a graphic chart illustrating results of the wearing tests represented by wearing volume of the contact recording magnetic head 3 performed for a test object of 10000 cSt of the first group and the first comparison example with the same condition except for load of the contact recording magnetic head 3, which is changed from 10 mgf to 10000 mgf.

Figure 8:
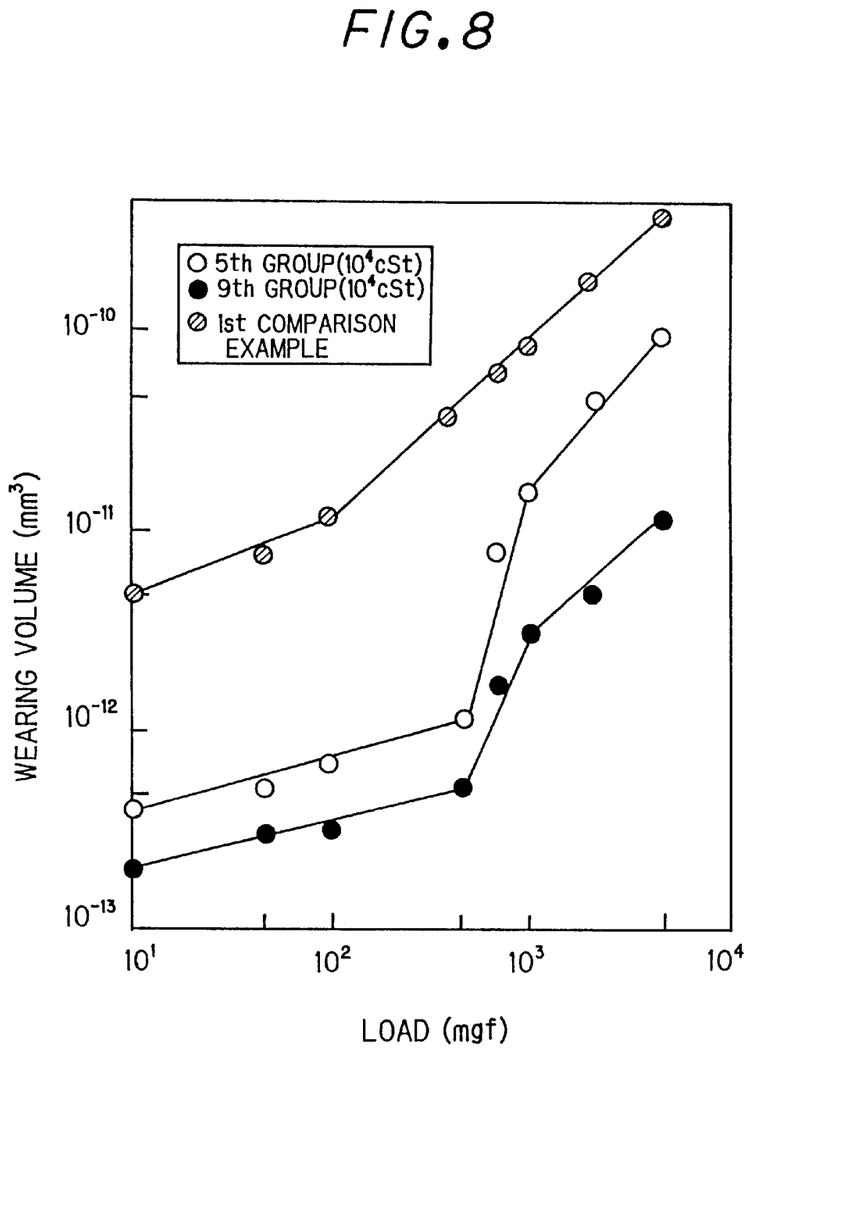
FIG. 8 is a graphic chart illustrating still another set of results of the wearing tests.

FIG. 8 is a graphic chart illustrating results of the same wearing tests to those of FIG. 7 performed for the fifth group with the maleic-anhydride-modified polybutene and the ninth group with the maleic-anhydride-modified poly-alpha-olefin.

FIGS. 7 and 8 shows that every of the polybutene, the maleic-anhydride-modified polybutene and the maleic-anhydride-modified poly-alpha-olefin applied for the lubricant film 10 gives a good robustness against wearing when the load is under 500 mgf, which means high film-forming abilities of them under a light load.

As heretofore described, in the first embodiment of the invention, a good robustness against wearing of a contact recording magnetic head can be obtained by providing a lubricant film 10, of one of the polybutene, the maleic-anhydride-modified polybutene and the maleic-anhydride-modified poly-alpha-olefin, on the surface of the magnetic disk 2, and the robustness can be effectively improved by further providing a combination layer 14, of polyethylene glycol or other materials beforehand described, between the lubricant film 10 and the body 15 of the magnetic disk 2.

What is claimed is:

1. A magnetic recording disk comprising a body coated with a lubricant thin film made from one of polybutene, maleic-anhydride-modified polybutene or maleicanhydride-modified poly-alpha-olefin selected from formula (1), (2) or (3):

where l is an integer from 3 to 100, while m and n are integers from 1 to 10; and wherein said film has a viscosity in the range from 100 cSt to 100,000 cSt.

2. A magnetic recording disk comprising a body coated with a lubricant thin film mixture of parts made from one of polybutene, maleic-anhydride-modified polybutene, or maleic-anhydride-modified poly-alpha-olefin selected from formula (1), (2) or (3);

where l is an integer from 3 to 100, while m and n are integers from 1 to 10; and wherein said parts have varying viscosities from 100 cSt to 100,000 cSt.

3. A magnetic recording disk comprising a body coated with a lubricant thin film of a mixture of parts of polybutene of a viscosity under 100 cSt and a viscosity over 100,000 cSt.

4. A magnetic recording disk comprising a body coated with multiple lubricant thin films made from one of maleic-anhydride-modified polybutene or maleic-anhydride-modified poly-alpha-olefin selected from formula (2) or (3);

where l is an integer from 3 to 100, while m and n are integers from 1 to 10; and with a first viscosity near 100 cSt and a second viscosity near 100,000 cSt.

5. A magnetic recording disk recited in claim 1, further comprising a combination layer between said lubricant thin film and said body.

6. A magnetic recording disk recited in claim 2, further comprising a combination layer between said lubricant thin film and said body.

7. A magnetic recording disk recited in claim 3, further comprising a combination layer between said lubricant thin film and said body.

8. A magnetic recording disk recited in claim 4, further comprising a combination layer between said lubricant thin film and said body.

9. A magnetic disk device comprising; a magnetic recording disk having a body coated with a lubricant thin film of one of polybutene, maleic-anhydride-modified polybutene and maleic-anhydride-modified poly-alpha-olefin selected from formula (1), (2) or (3):

where l is an integer from 3 to 100, while m and n are integers from 1 to 10; and having of a viscosity from 100 cSt to 100,000 cSt;

a contact recording magnetic head for reading information from and writing information to said magnetic recording disk; and a support mechanism for supporting and said contact recording magnetic head.

10. A magnetic disk device comprising; a magnetic recording disk having a body coated with a lubricant thin film made from one of polybutene, maleic-anhydride-modified polybutene or maleic-anhydride-modified poly-alpha-olefin and having the formula (1), (2) or (3);

where l is an integer from 3 to 100, while m and n are integers from 1 to 10; and wherein said film has a viscosity from 100 cSt to 100,000 cSt;

a contact recording magnetic head for reading information from and writing information to said magnetic recording disk; and a support mechanism for supporting said contact recording magnetic head.

11. A magnetic disk device comprising;

a magnetic recording disk having a body coated with a lubricant thin film having a mixture of polybutenes, with a first polybutene viscosity under 100 cSt and a second polybutene viscosity over 100,000 cSt;

a contact recording magnetic head for reading information from and writing information to said magnetic recording disk; and a support mechanism for supporting said contact recording magnetic head.

12. A magnetic disk device comprising:

a magnetic recording disk having a body coated with multiple lubricant thin films made from one of maleic-anhydride-modified polybutene or maleic-anhydride-modified poly-alpha-olefin having the formula (2) or (3);

where l is an integer from 3 to 100, while m and n are integers from 1 to 10; and with a first viscosity near 100 cSt and a second viscosity near 100,000 cSt;

a contact recording magnetic head for reading information from and writing information to said magnetic recording disk; and a support mechanism for supporting said contact recording magnetic head.

13. A magnetic disk device recited in claim 9, wherein said magnetic disk further comprising a combination layer between said lubricant thin film and said body.

14. A magnetic disk device recited in claim 10, wherein said magnetic disk further comprising a combination layer between said lubricant thin film and said body.

15. A magnetic disk device recited in claim 11, wherein said magnetic disk further comprising a combination layer between said lubricant thin film and said body.

16. A magnetic disk device recited in claim 12, wherein said magnetic disk further comprising a combination layer between said lubricant thin film and said body.

* * * * *